US008230462B2

(12) United States Patent
Yousef (10) Patent No.: US 8,230,462 B2
(45) Date of Patent: Jul. 24, 2012

(54) FAST CHANNEL SWITCHING FOR ENCRYPTED MOBILE MULTIMEDIA MULTICAST SYSTEM

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 708 days.

(21) Appl. No.: 12/018,483

(22) Filed: Jan. 23, 2008

(65) Prior Publication Data

US 2009/0187946 A1    Jul. 23, 2009

(51) Int. Cl.
*H04N 5/445* (2011.01)
*H04N 7/173* (2011.01)
*H04N 5/63* (2006.01)
*G06F 3/00* (2006.01)

(52) U.S. Cl. ......... 725/62; 725/132; 370/236.1; 380/36; 714/776

(58) Field of Classification Search .................... 725/27, 725/62, 140, 31, 46, 132; 380/36, 274; 370/336, 370/395.4, 236.1, 510; 714/776; 455/432.2
See application file for complete search history.

(56) References Cited

U.S. PATENT DOCUMENTS

| | | | | |
|---|---|---|---|---|
| 4,528,660 A * | 7/1985 | Gentry | | 370/428 |
| 7,720,027 B2 * | 5/2010 | Ling et al. | | 370/328 |
| 7,787,548 B2 * | 8/2010 | Auranen et al. | | 375/260 |
| 7,855,996 B2 * | 12/2010 | Yousef | | 370/336 |
| 2005/0013277 A1 * | 1/2005 | Marque-Pucheu | | 370/336 |
| 2006/0258410 A1 * | 11/2006 | Collins et al. | | 455/574 |
| 2007/0097272 A1 * | 5/2007 | Moradi et al. | | 348/731 |
| 2007/0234395 A1 * | 10/2007 | Dureau et al. | | 725/135 |
| 2007/0277219 A1 * | 11/2007 | Toebes et al. | | 725/139 |
| 2008/0104392 A1 * | 5/2008 | Satoshi et al. | | 713/164 |
| 2008/0298337 A1 * | 12/2008 | Rezaei et al. | | 370/345 |
| 2010/0220821 A1 * | 9/2010 | Vrcelj et al. | | 375/345 |
| 2010/0241931 A1 * | 9/2010 | Choi et al. | | 714/776 |

\* cited by examiner

*Primary Examiner* — Pankaj Kumar
*Assistant Examiner* — Reuben M Brown
(74) *Attorney, Agent, or Firm* — Rahman LLC (57) ABSTRACT

Enhancing a stream layer transmission for a MediaFLO™ mobile multimedia multicast system comprising a transmitter and a receiver. Code word (CW) computations are performed on a current channel being accessed by the receiver. A favorite channel that a user is statistically mostly likely to switch to on the receiver at any particular time is anticipated. The Overhead Information Symbols (OIS) for each favorite channel is periodically monitored. The receiver remains in a sleep mode while data bursts are received from non-favorite channels, and then wakes up during data bursts of the favorite channel. The same CW computations are performed on the favorite channel as were being performed on the current channel. A cyclic redundancy check (CRC) is performed once the CW computations are performed upon selecting the favorite channel.

20 Claims, 8 Drawing Sheets

FAST CHANNEL SWITCHING FOR ENCRYPTED MOBILE MULTIMEDIA MULTICAST SYSTEM

BACKGROUND

1. Technical Field

The embodiments herein generally relate to wireless communication systems, and, more particularly, to mobile television (TV) multicast technology.

2. Description of the Related Art

The MediaFLO™ (Forward Link Only) mobile multimedia multicast system available from Qualcomm, Inc., California, USA, is an alternative mobile multicast technology for the efficient transmission of multimedia data streams to mobile devices using TV. One radio frequency (RF) channel is shared among many TV channels (TV programs). These TV channels are multiplexed either in the time domain or in the frequency domain. When the TV channels are multiplexed in the time domain, each channel is given full access to the entire RF channel bandwidth for a short period of time (burst duration). After that burst is transmitted, bursts for other channels occupy the RF channel and so on. This multiplexing process is called time division multiplexing (TDM)

Figure 1:
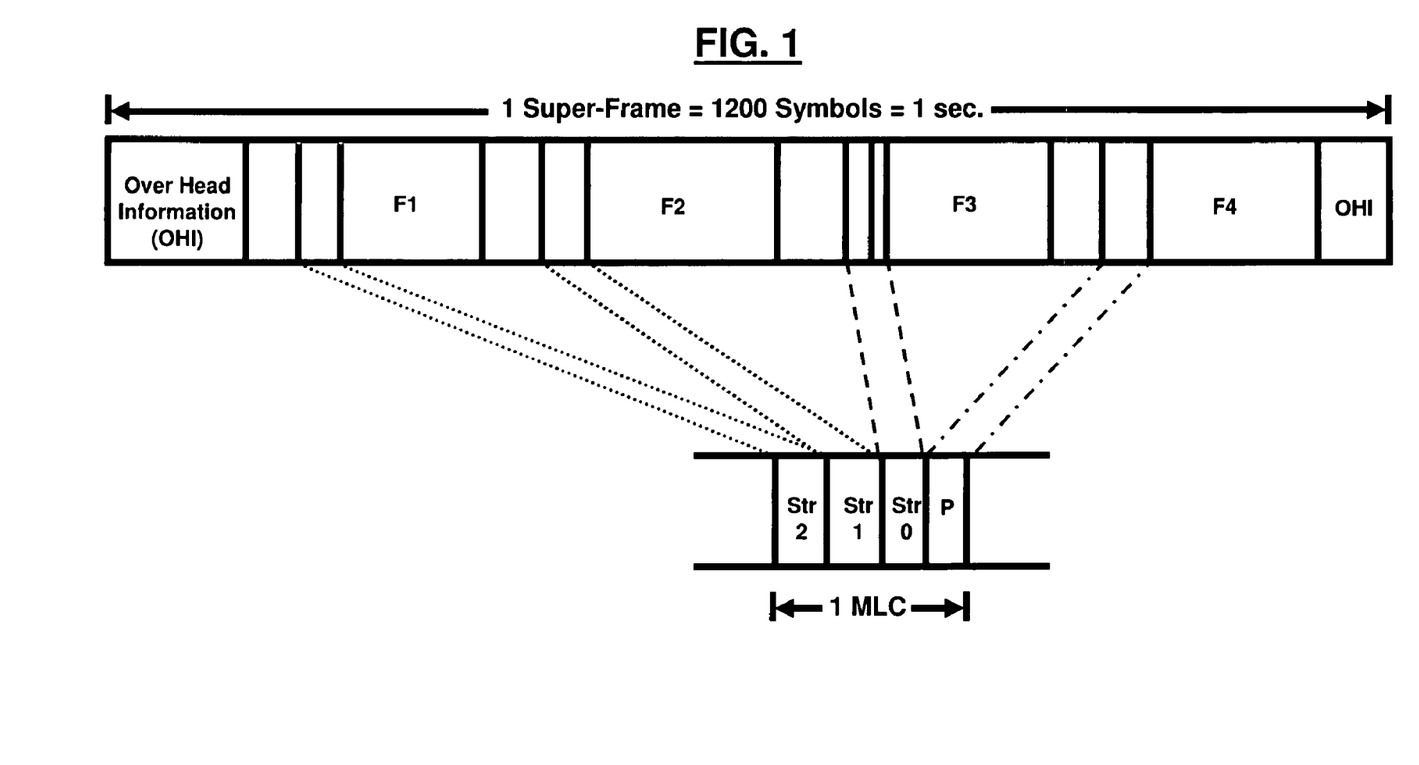
FIG. 1 is a schematic diagram illustrating a data stream in a super-frame structure.

Multimedia streams can comprise various channels coming from different sources. The smallest channel transmission unit is called a Multicast Logical Channel (MLC). Each MLC is composed of three streams plus parity bits for error detection as indicated in FIG. 1, then each MLC is divided into four bursts, such that one burst per MLC is transmitted per frame, and every four frames are packed together in addition to overhead information to form a Super-Frame of duration one second. These streams are multiplexed/demultiplexed to/from a single MLC in a layer called the stream layer.

Streams 1 and 2 carry audio and video information of the channel requested by the user, while stream 0 carries control information used in the decryption of these audio and video information at the receiver, a number of MLCs are multiplexed together in the time domain to form a frame, and then four frames are packed together in addition to overhead information to form a super-frame having a duration of one second.

Figure 2:
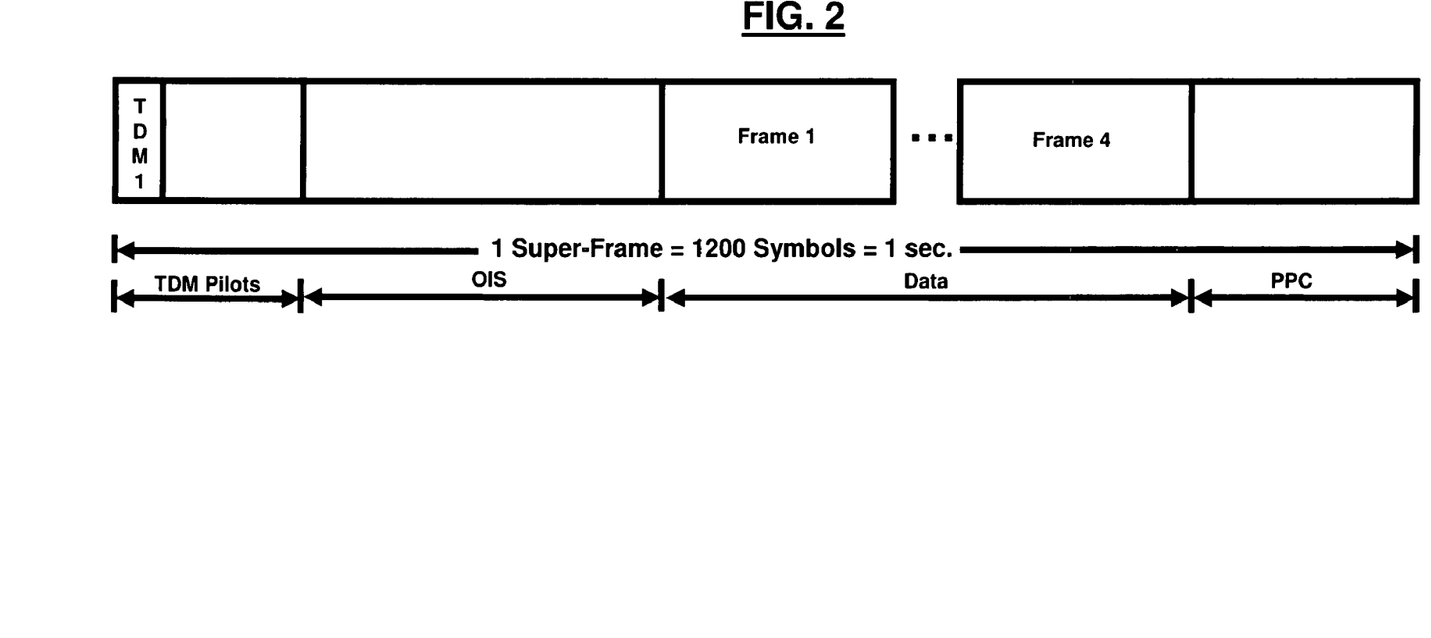
FIG. 2 is a schematic diagram illustrating a super-frame structure.

A super-frame is divided into four portions as shown in FIG. 2: TDM pilots, Overhead Information Symbols (OIS), Data, and Pilot Positioning Channel (PPC). TDM1 is the first symbol of a super-frame and marks its beginning. In addition to being used for frame synchronization, TDM1 can also be used for initial time and frequency synchronization, so the receiver can immediately start decoding the information carried by the OIS. The OIS contain the time-frequency allocation for each MLC in the current super-frame. With respect to data, when an MLC is transmitted in a super-frame the payload is divided into four equal bursts, with each burst transmitted in a unique frame. The PPC can be used for transmitter identification and/or position location at the receiver. Super-frames are transmitted in sequence to be received at the service user. To ensure correct reception there must be synchronization between the transmitter and the receiver, and then several steps are performed to get the data streams ready for display.

Figure 3:
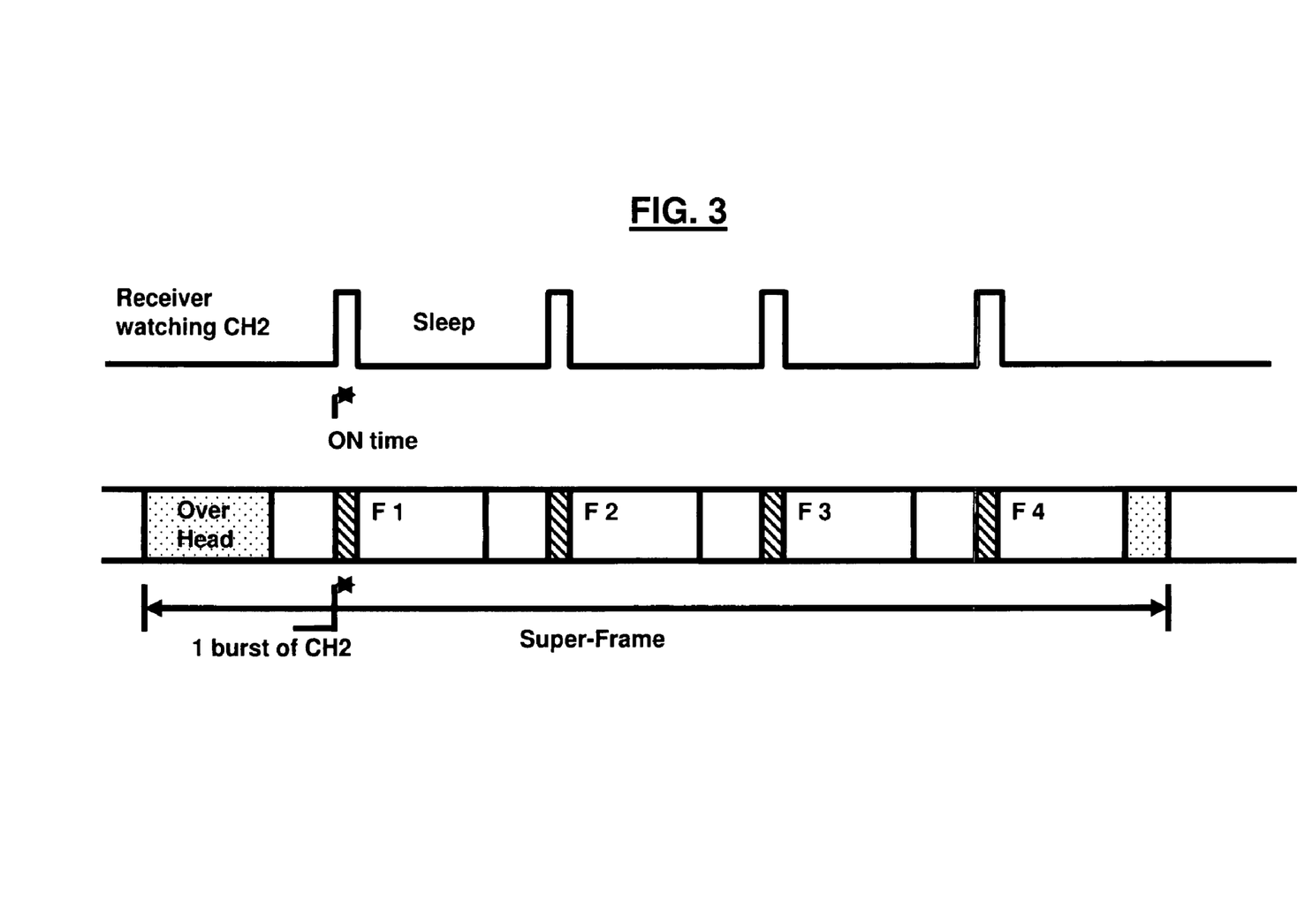
FIG. 3 is a schematic diagram illustrating an example of a user watching a channel (CH2) on a mobile TV receiver.
Figure 4:
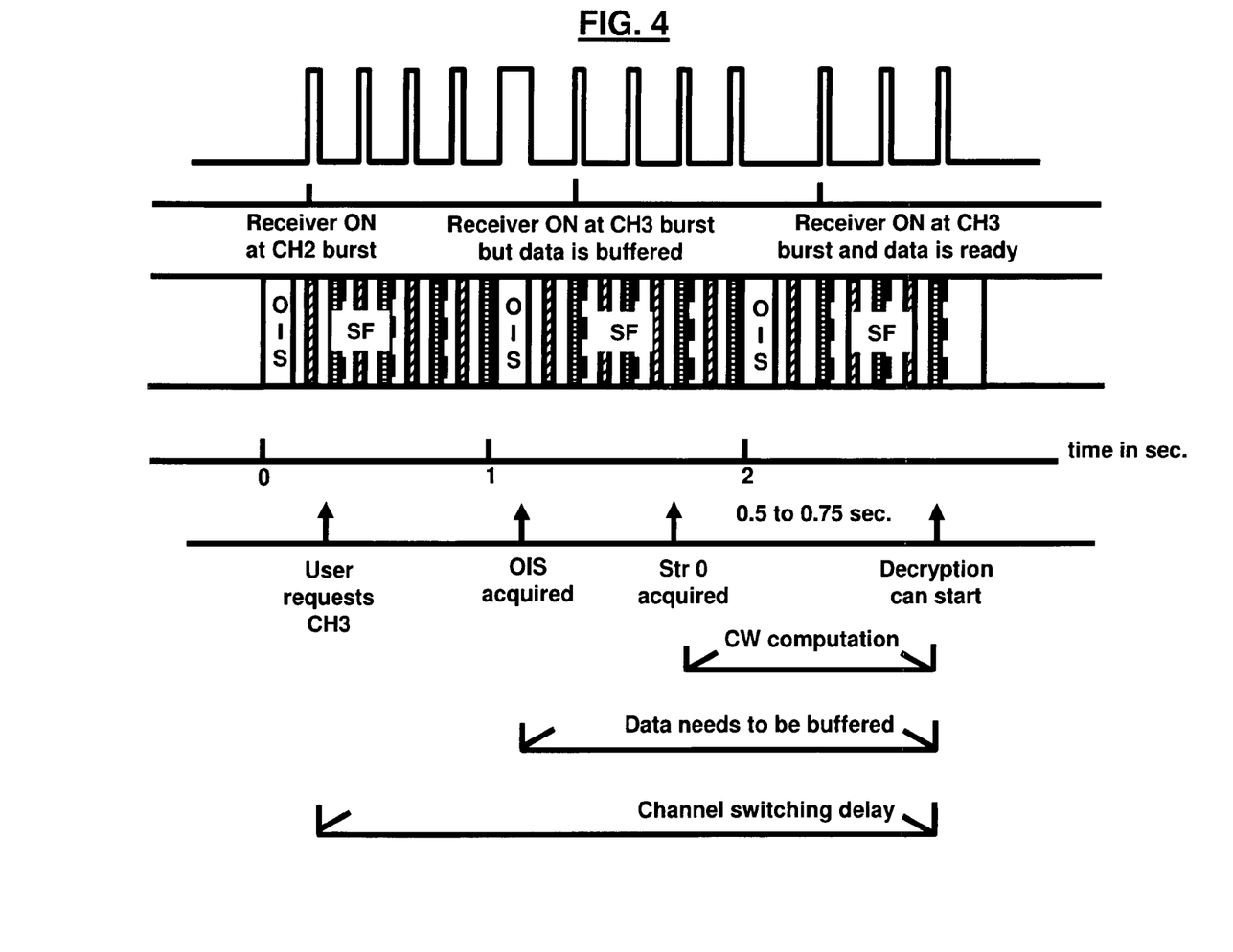
FIG. 4 is a schematic diagram illustrating an example of a user requesting a channel change.

A receiver which is watching only one channel (for example, CH2) needs only to be active (ON) during the periods of CH2 bursts. In order to conserve battery consumption, such receiver will shut off its circuits when CH2 bursts are not occupying the RF channel. It thus becomes in a SLEEP mode. This shows that TDM of channels can help reduce power consumption of a receiver watching a single channel. When the user switches to another channel, the receiver executes these steps: First, the receiver looks for the TDM1 (a symbol which indicates the beginning of a super-frame) as shown in FIG. 3. Then, it looks for the OIS (five symbols contain the information about the specific location of the MLC) in the current Super-Frame that belongs to the Channel required by the user. Second, as the receiver reaches the MLC in any of the four frames, it starts looking for stream 0 to extract several messages (Entitlement Control Messages (ECM) and Encryption Information Messages (EIM)) from it. Third, the receiver uses these messages, in addition to a message related to each user (Entitlement Management Message (EMM)) defined by the service provider, to be able to extract the code word (CW), which is the key used in a descrambling process. Finally, the receiver uses that CW to descramble the audio and video information contained in streams 1 and 2. This scenario is repeated every super-frame to guarantee efficient reception of data. However, this causes a problem; an example is shown in FIG. 4, if the user switches from CH2 to CH3.

The worst case occurs when the user issues a command to switch to CH3 right after the burst of CH3 ends. In this case, the receiver has to wait until the next burst that belongs to CH3 appears on the RF channel (in the next super-frame to get its OIS data) as in FIG. 4. This causes the user to wait for a given period of time denoted as the channel switching delay. This means that the delay introduced when the user turns on the channel is very large and also during switching from one channel to another; i.e., long channel switching delay. Accordingly, there remains a need to enhance the stream layer transmission for the MediaFLO™ mobile multimedia multicast system.

SUMMARY

In view of the foregoing, an embodiment herein provides a method of enhancing stream layer transmission for a Media-FLO mobile multimedia multicast system comprising a transmitter and a receiver, wherein a plurality of MLC forming a data frame is sent from the transmitter, wherein each MLC comprises multimedia data streams comprising a stream 0 data packet, a stream 1 data packet, a stream 2 data packet, and parity data bits, and wherein four data frames comprises a super-frame, and wherein each the super-frame comprises TDM pilots, OIS, data, and a PPC; the receiver performing a process comprising performing CW computations on a current channel being accessed by the receiver; anticipating a favorite channel that a user is statistically mostly likely to switch to on the receiver at any particular time; periodically monitoring the OIS for each favorite channel every 2N periods, where N is a crypto period of a CW; remaining in a sleep mode while data bursts are received from non-favorite channels; waking up from the sleep mode during data bursts of the favorite channel; performing the same CW computations being performed on the current channel on the favorite channel; and performing a cyclic redundancy check (CRC) of the stream 0 data packet once the CW computations are performed upon selecting the favorite channel.

The anticipating process may comprise statistically predicting user channel switching behavior based on past user channel switching behavior. Moreover, the anticipating process may comprise selecting a channel immediately up or down with respect to the current channel. Furthermore, the anticipating process may comprise selecting a channel that was previously viewed immediately prior to selection of the current channel. The method may further comprise programming a set of favorite channels from among all channels available for viewing on the receiver, wherein the anticipating process comprises selecting one favorite channel from the set of favorite channels. Additionally, the method may further comprise performing error detection on the multimedia data streams. Also, the method may further comprise correcting errors in the multimedia data streams using redundant data stored on a fourth frame of the super-frame. Preferably, a CW is ready for computing in the receiver such that if the favorite channel is selected immediately after the current channel, then decryption of the super-frame begins immediately.

Another embodiment provides a method of enhancing stream layer transmission for a MediaFLO mobile multimedia multicast system comprising a transmitter and a receiver, wherein a plurality of MLC forming a data frame is sent from the transmitter, wherein each MLC comprises multimedia data streams comprising a stream 0 data packet, a stream 1 data packet, a stream 2 data packet, and parity data bits, and wherein four data frames comprises a super-frame, wherein the method comprises performing CW computations on a current channel being accessed by the receiver; anticipating a favorite channel that a user is statistically mostly likely to switch to on the receiver at any particular time; periodically monitoring the OIS for each favorite channel; remaining in a sleep mode while data bursts are received from non-favorite channels; waking up from the sleep mode during data bursts of the favorite channel; performing the same CW computations being performed on the current channel on the favorite channel; and performing a CRC of the stream 0 data packet once the CW computations are performed upon selecting the favorite channel.

The anticipating process may comprise statistically predicting user channel switching behavior based on past user channel switching behavior. Moreover, the anticipating process may comprise selecting a channel immediately adjacent to the current channel. Furthermore, the anticipating process may comprise selecting a channel that was previously selected immediately prior to selection of the current channel. The method may further comprise performing error detection on the multimedia data streams; and correcting errors in the multimedia data streams using redundant data stored on a fourth frame of the super-frame.

Another embodiment provides a system for enhancing stream layer transmission for a MediaFLO mobile multimedia multicast environment, wherein the system comprises a transmitter adapted to send a plurality of MLC forming a data frame, wherein each MLC comprises multimedia data streams comprising a stream 0 data packet, a stream 1 data packet, a stream 2 data packet, and parity data bits, and wherein four data frames comprises a super-frame, and wherein each the super-frame comprises TDM pilots, OIS, data, and a PPC. The system also includes a receiver that receives the MLC from the transmitter, wherein the receiver is adapted to perform CW computations on a current channel being accessed by the receiver; anticipate a favorite channel that a user is statistically mostly likely to switch to on the receiver at any particular time; periodically monitor the OIS for each favorite channel every 2N periods, where N is a crypto period of a CW; remain in a sleep mode while data bursts are received from non-favorite channels; wake up from the sleep mode during data bursts of the favorite channel; and perform the same CW computations being performed on the current channel on the favorite channel. The system also includes CRC hardware on the receiver to perform a CRC of the stream 0 data packet once the CW computations are performed upon selecting the favorite channel.

The receiver may anticipate the favorite channel by statistically predicting user channel switching behavior based on past user channel switching behavior. Moreover, the receiver may anticipate the favorite channel by selecting a channel immediately up or down with respect to the current channel. Furthermore, the receiver may anticipate the favorite channel by selecting a channel that was previously viewed immediately prior to selection of the current channel. The system may further comprise an error detection component in the receiver adapted to perform error detection on the multimedia data streams. Additionally, the system may further comprise an error corrector component in the receiver adapted to correct errors in the multimedia data streams using redundant data stored on a fourth frame of the super-frame. Preferably, a CW is ready for computing in the receiver such that if the favorite channel is selected immediately after the current channel, then decryption of the super-frame begins immediately.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to enhance the stream layer transmission for the MediaFLO™ mobile multimedia multicast system. The embodiments herein achieve this by providing a technique to reduce the channel switching delay in the stream layer transmission by anticipating channel switching and buffering one burst from each anticipated channel. Referring now to the drawings, and more particularly to FIGS. 5 through 8, where similar reference characters denote corresponding features consistently throughout the figures, there are shown preferred embodiments.

Figure 5:
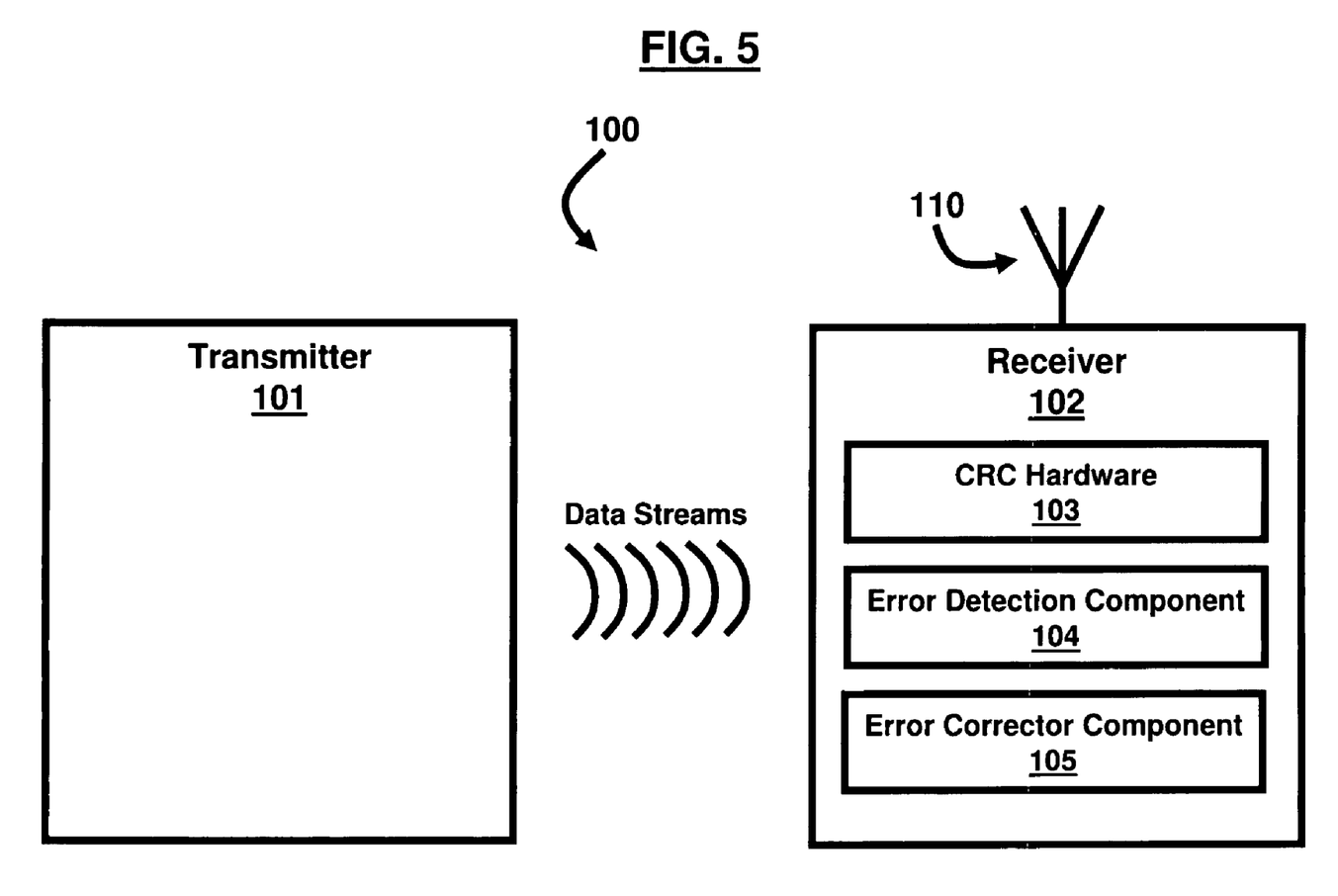
FIG. 5 illustrates a block diagram of a system according to an embodiment herein.

FIG. 5 illustrates a block diagram of a system 100 for enhancing stream layer transmission for a MediaFLO™ mobile multimedia multicast environment according to an embodiment herein, wherein the system 100 comprises a transmitter 101 adapted to send a plurality of MLC forming a data frame, wherein each MLC comprises multimedia data streams comprising a stream 0 data packet, a stream 1 data packet, a stream 2 data packet, and parity data bits, and wherein four data frames comprises a super-frame, and wherein each the super-frame comprises TDM pilots, OIS, data, and a PPC. The system 100 also includes a receiver 102 that receives the MLC from the transmitter 101 via antenna 110, wherein the receiver 102 is adapted to perform CW computations on a current channel being accessed by the receiver 102; anticipate a favorite channel that a user is statistically mostly likely to switch to on the receiver 102 at any particular time; periodically monitor the OIS for each favorite channel every 2N periods, where N is a crypto period of a CW; remain in a sleep mode while data bursts are received from non-favorite channels; wake up from the sleep mode during data bursts of the favorite channel; and perform the same CW computations being performed on the current channel on the favorite channel. The system 100 also includes CRC hardware 103 on the receiver 102 to perform a CRC of the stream 0 data packet once the CW computations are performed upon selecting the favorite channel.

The receiver 102 may anticipate the favorite channel by statistically predicting user channel switching behavior based on past user channel switching behavior. Moreover, the receiver 102 may anticipate the favorite channel by selecting a channel immediately up or down with respect to the current channel. Furthermore, the receiver 102 may anticipate the favorite channel by selecting a channel that was previously viewed immediately prior to selection of the current channel. The system 100 may further comprise an error detection component 104 in the receiver 102 adapted to perform error detection on the multimedia data streams. Additionally, the system 100 may further comprise an error corrector component 105 in the receiver 102 adapted to correct errors in the multimedia data streams using redundant data stored on a fourth frame of the super-frame. Preferably, a CW is ready for computing in the receiver 102 such that if the favorite channel is selected immediately after the current channel, then decryption of the super-frame begins immediately.

According to the embodiments herein, the receiver 102 anticipates the channels that the user can switch to at any time. This may be accomplished by predicting typical user channel switching behavior such as switching up or down on a channel list provided to the user on the receiver 102. Also, this may be accomplished by anticipating that the user can recall the last channel he/she was watching. The steps performed by the receiver 102 include (i) periodically monitoring the OIS for each favorite channel, every 2N periods where N is the crypto period of a CW, and whereby OIS show the position of the anticipated channel in the current super frame; (ii) waking up (receiver ON) during the bursts of anticipated channel to get stream 0, besides the usual wake up during the bursts of the current channel; (iii) CW processing on anticipated channel besides the normal processing of the current channel; and (iv) wherein the CW of the anticipated favorite channel is ready and whenever the user switches to it, the CW computation delay is removed.

Figure 6:
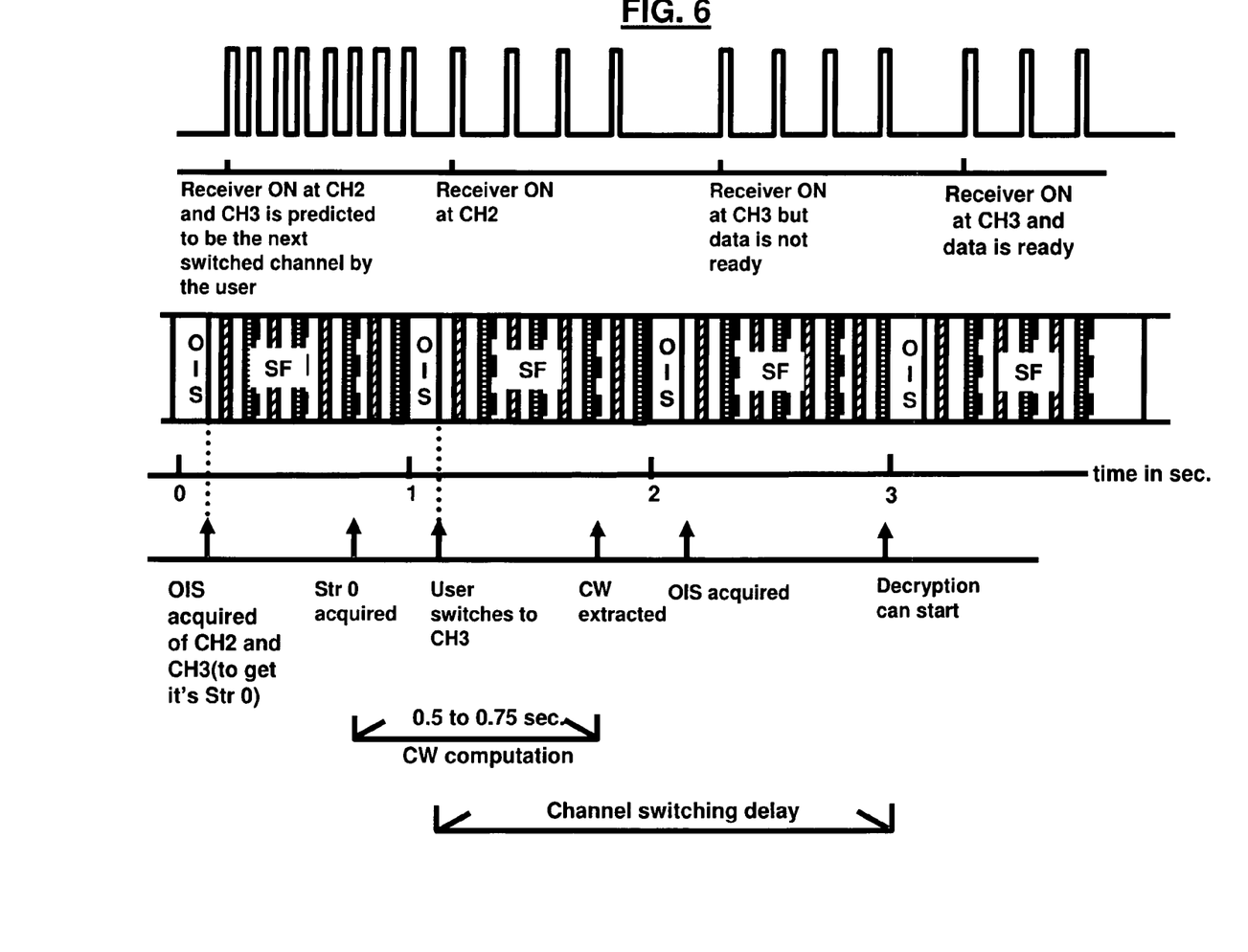
FIG. 6 is a schematic diagram illustrating an example of a user requesting a channel change after buffering a favorite channel (CH3) according to an embodiment herein.

The time spent since the user switches certain channel until the data are ready to be displayed is called the channel switching delay. By comparing the example before and after anticipation of a favorite channel (FIGS. 4 and 6, respectively), it is clear that this delay is reduced in the second case as shown in FIG. 6 by the CW computation delay, as the CW of the anticipated channel is already computed by the receiver 102 at an earlier time. In FIG. 6, the CW is ready and the receiver 102 is ON at CH3, and the receiver 102 waits until the last burst of this channel is received to perform forward error correction (error correction bits are found in the last burst of a certain MLC parity bits). The channel switching delay is reduced by (CW computation delay 0.5 to 0.75 seconds).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
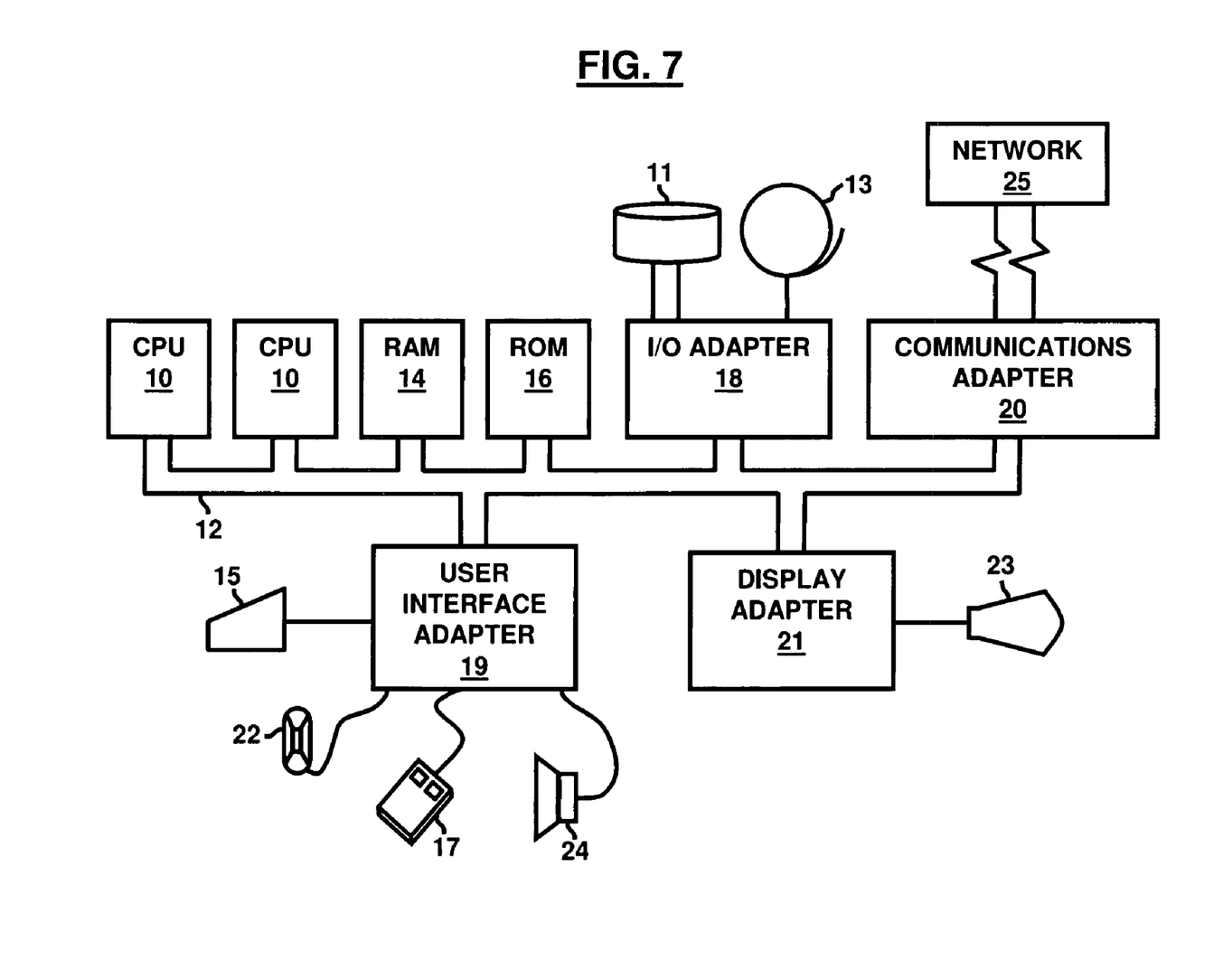
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8:
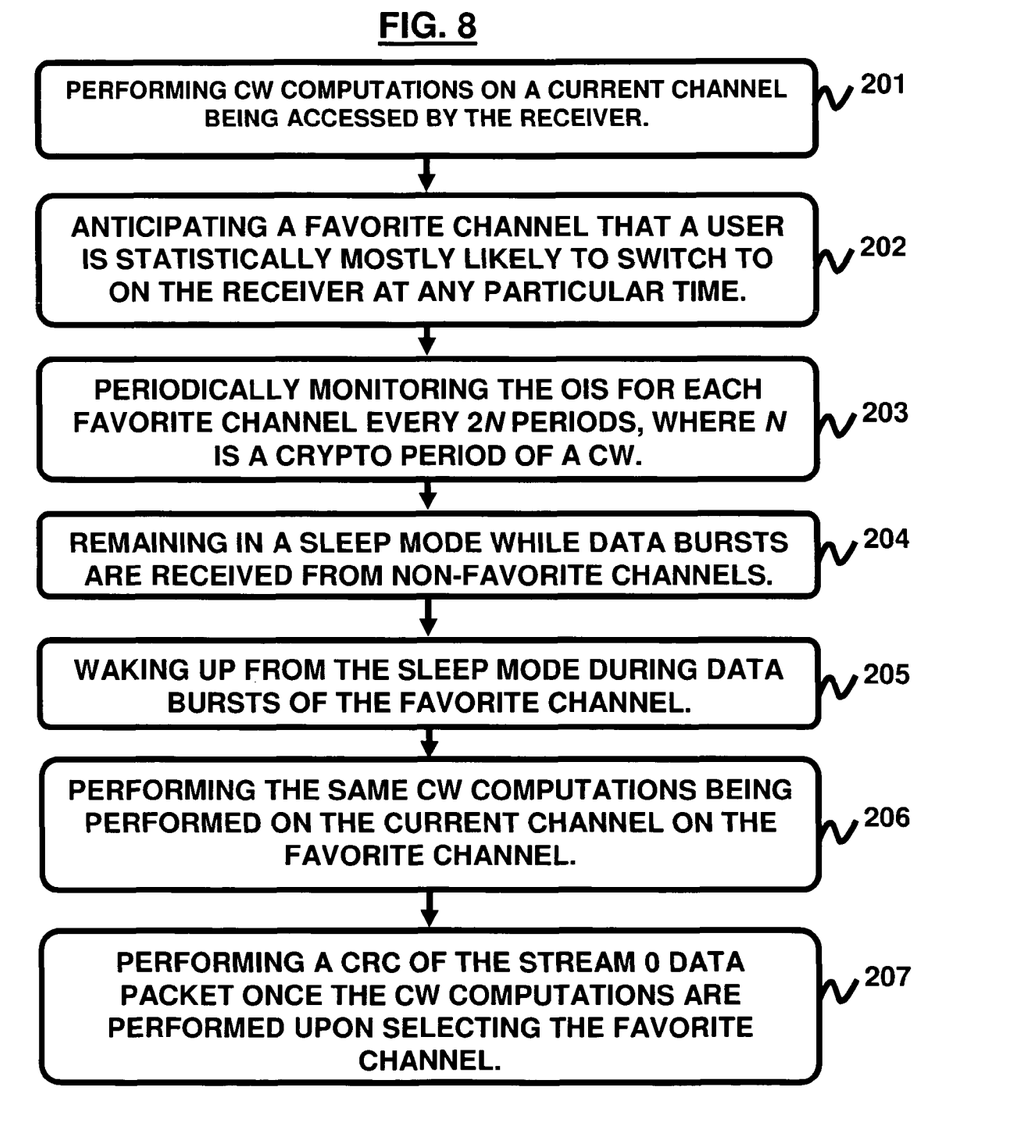
FIG. 8 is a flow diagram illustrating a preferred method according to an embodiment herein.

FIG. 8, with reference to FIGS. 5 through 7, is a flow diagram illustrating a method of enhancing stream layer transmission for a MediaFLO™ mobile multimedia multicast system comprising a transmitter 101 and a receiver 102, wherein a plurality of MLC forming a data frame is sent from the transmitter 101, wherein each MLC comprises multimedia data streams comprising a stream 0 data packet, a stream 1 data packet, a stream 2 data packet, and parity data bits, and wherein four data frames comprises a super-frame, and wherein each the super-frame comprises TDM pilots, OIS, data, and a PPC; the receiver 102 performing a process comprising performing (201) CW computations on a current channel being accessed by the receiver 102; anticipating (202) a favorite channel that a user is statistically mostly likely to switch to on the receiver 102 at any particular time; periodically monitoring (203) the OIS for each favorite channel every 2N periods, where N is a crypto period of a CW; remaining (204) in a sleep mode while data bursts are received from non-favorite channels; waking (205) up from the sleep mode during data bursts of the favorite channel; performing (206) the same CW computations being performed on the current channel on the favorite channel; and performing (207) a CRC of the stream 0 data packet once the CW computations are performed upon selecting the favorite channel.

The anticipating process (202) may comprise statistically predicting user channel switching behavior based on past user channel switching behavior. Moreover, the anticipating process (202) may comprise selecting a channel immediately up or down with respect to the current channel. Furthermore, the anticipating process (202) may comprise selecting a channel that was previously viewed immediately prior to selection of the current channel. The method may further comprise programming a set of favorite channels from among all channels available for viewing on the receiver 102, wherein the anticipating process (202) comprises selecting one favorite channel from the set of favorite channels. Additionally, the method may further comprise performing error detection on the multimedia data streams. Also, the method may further comprise correcting errors in the multimedia data streams using redundant data stored on a fourth frame of the super-frame. Preferably, a CW is ready for computing in the receiver 102 such that if the favorite channel is selected immediately after the current channel, then decryption of the super-frame begins immediately.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of enhancing stream layer transmission for a MediaFLO mobile multimedia multicast system comprising a transmitter and a receiver, wherein a plurality of multicast logical channels (MLC) forming a data frame is sent from said transmitter, wherein each MLC comprises multimedia data streams comprising a stream 0 data packet, a stream 1 data packet, a stream 2 data packet, and parity data bits, and wherein four data frames comprises a super-frame, and wherein each said super-frame comprises time-division multiplexing (TDM) pilots, Overhead Information Symbols (OIS), data, and a Pilot Positioning Channel (PPC); said receiver performing a process comprising:

performing code word (CW) computations on a current channel being accessed by said receiver;

anticipating a favorite channel that a user is statistically mostly likely to switch to on said receiver at any particular time;

periodically monitoring the OIS for each favorite channel every 2N periods, where N is a crypto period of a CW;

remaining in a sleep mode while data bursts are received from non-favorite channels;

waking up from said sleep mode during data bursts of the anticipated favorite channel;

performing the same CW computations being performed on said current channel on said anticipated favorite channel prior to selection of said anticipated favorite channel by said user; and performing a cyclic redundancy check (CRC) of said stream 0 data packet once said CW computations are performed upon selecting said anticipated favorite channel.

2. The method of claim 1, wherein the anticipating process comprises statistically predicting user channel switching behavior based on past user channel switching behavior.

3. The method of claim 1, wherein the anticipating process comprises selecting a channel immediately up or down with respect to said current channel.

4. The method of claim 1, wherein the anticipating process comprises selecting a channel that was previously viewed immediately prior to selection of said current channel.

5. The method of claim 1, further comprising programming a set of favorite channels from among all channels available for viewing on said receiver, wherein the anticipating process comprises selecting one favorite channel from said set of favorite channels.

6. The method of claim 1, further comprising performing error detection on said multimedia data streams.

7. The method of claim 6, further comprising correcting errors in said multimedia data streams using redundant data stored on a fourth frame of said super-frame.

8. The method of claim 1, wherein a CW is ready for computing in said receiver such that if said favorite channel is selected immediately after said current channel, then decryption of said super-frame begins immediately.

9. A method of enhancing stream layer transmission for a MediaFLO mobile multimedia multicast system comprising a transmitter and a receiver, wherein a plurality of multicast logical channels (MLC) forming a data frame is sent from said transmitter, wherein each MLC comprises multimedia data streams comprising a stream 0 data packet, a stream 1 data packet, a stream 2 data packet, and parity data bits, and wherein four data frames comprises a super-frame, said method comprising:

performing code word (CW) computations on a current channel being accessed by said receiver;

anticipating a favorite channel that a user is statistically mostly likely to switch to on said receiver at any particular time;

periodically monitoring the OIS for each favorite channel every 2N periods, where N is a crypto period of a CW;

remaining in a sleep mode while data bursts are received from non-favorite channels;

waking up from said sleep mode during data bursts of the anticipated favorite channel;

performing the same CW computations being performed on said current channel on said anticipated favorite channel prior to selection of said anticipated favorite channel by said user; and performing a cyclic redundancy check (CRC) of said stream 0 data packet once said CW computations are performed upon selecting said anticipated favorite channel.

10. The method of claim 9, wherein the anticipating process comprises statistically predicting user channel switching behavior based on past user channel switching behavior.

11. The method of claim 9, wherein the anticipating process comprises selecting a channel immediately adjacent to said current channel.

12. The method of claim 9, wherein the anticipating process comprises selecting a channel that was previously selected immediately prior to selection of said current channel.

13. The method of claim 9, further comprising:

performing error detection on said multimedia data streams; and correcting errors in said multimedia data streams using redundant data stored on a fourth frame of said super-frame.

14. A system for enhancing stream layer transmission for a MediaFLO mobile multimedia multicast environment, said system comprising:

a transmitter that sends a plurality of multicast logical channels (MLC) forming a data frame, wherein each MLC comprises multimedia data streams comprising a stream 0 data packet, a stream 1 data packet, a stream 2 data packet, and parity data bits, and wherein four data frames comprises a super-frame, and wherein each said super-frame comprises time-division multiplexing (TDM) pilots, Overhead Information Symbols (OIS), data, and a Pilot Positioning Channel (PPC);

a receiver that receives said MLC from said transmitter, wherein said receiver:

performs code word (CW) computations on a current channel being accessed by said receiver;

anticipates a favorite channel that a user is statistically mostly likely to switch to on said receiver at any particular time;

periodically monitors the OIS for each favorite channel every 2N periods, where N is a crypto period of a CW;

remains in a sleep mode while data bursts are received from non-favorite channels;

wakes up from said sleep mode during data bursts of the anticipated favorite channel; and performs the same CW computations being performed on said current channel on said anticipated favorite channel prior to selection of said anticipated favorite channel by said user; and cyclic redundancy check (CRC) hardware on said receiver to perform a CRC of said stream 0 data packet once said CW computations are performed upon selecting said anticipated favorite channel.

15. The system of claim 14, wherein the receiver anticipates said favorite channel by statistically predicting user channel switching behavior based on past user channel switching behavior.

16. The system of claim 14, wherein the receiver anticipates said favorite channel by selecting a channel immediately up or down with respect to said current channel.

17. The system of claim 14, wherein the receiver anticipates said favorite channel by selecting a channel that was previously viewed immediately prior to selection of said current channel.

18. The system of claim 14, further comprising an error detection component in said receiver that performs error detection on said multimedia data streams.

19. The system of claim 18, further comprising an error corrector component in said receiver to correct errors in said multimedia data streams using redundant data stored on a fourth frame of said super-frame.

20. The system of claim 14, wherein a CW is ready for computing in said receiver such that if said favorite channel is selected immediately after said current channel, then decryption of said super-frame begins immediately.

* * * * *